(12) United States Patent
Figley et al.

(10) Patent No.: US 10,667,511 B2
(45) Date of Patent: Jun. 2, 2020

(54) LIQUID PESTICIDAL COMPOSITION

(71) Applicant: BASF SE, Ludwigshafen am Rhein (DE)

(72) Inventors: Timothy M. Figley, Watkinsville, GA (US); Rodney F. Klima, Morrow, OH (US)

(73) Assignee: BASF SE, Ludwigshafen am Rhein (DE)

( * ) Notice: Subject to any disclaimer, the term of this patent is extended or adjusted under 35 U.S.C. 154(b) by 0 days.

(21) Appl. No.: 15/769,360

(22) PCT Filed: Oct. 20, 2016

(86) PCT No.: PCT/US2016/057883
§ 371 (c)(1),
(2) Date: Apr. 19, 2018

(87) PCT Pub. No.: WO2017/070327
PCT Pub. Date: Apr. 27, 2017

(65) Prior Publication Data
US 2018/0303087 A1    Oct. 25, 2018

Related U.S. Application Data

(60) Provisional application No. 62/244,427, filed on Oct. 21, 2015.

(51) Int. Cl.
| | | |
|---|---|---|
| *A01N 25/04* | (2006.01) | |
| *A01N 47/24* | (2006.01) | |
| *A01N 43/40* | (2006.01) | |
| *A01N 53/00* | (2006.01) | |
| *A01N 25/30* | (2006.01) | |
| *A01N 25/02* | (2006.01) | |

(52) U.S. Cl.
CPC ............. *A01N 25/04* (2013.01); *A01N 25/02* (2013.01); *A01N 25/30* (2013.01); *A01N 43/40* (2013.01); *A01N 47/24* (2013.01); *A01N 53/00* (2013.01)

(58) Field of Classification Search
CPC ........ A01N 25/04; A01N 53/00; A01N 47/24; A01N 43/40; A01N 25/02; A01N 25/30
See application file for complete search history.

(56) References Cited

U.S. PATENT DOCUMENTS

| | | | |
|---|---|---|---|
| 6,251,415 B1 * | 6/2001 | Herbert ................. | A01N 25/02 424/405 |
| 6,488,946 B1 | 12/2002 | Milius et al. | |
| 2004/0002438 A1 * | 1/2004 | Hawkins ................ | A01N 25/04 510/417 |

FOREIGN PATENT DOCUMENTS

| | | |
|---|---|---|
| EP | 0784972 A2 | 7/1997 |
| WO | 9503881 A1 | 2/1995 |
| WO | 2004100661 A2 | 11/2004 |
| WO | WO-2014117118 A1 * | 7/2014 ............. A01N 63/04 |

OTHER PUBLICATIONS

International Search Report and Written Opinion for International Application No. PCT/US2016/057883, dated Dec. 16, 2016, 10 pages.

* cited by examiner

*Primary Examiner* — Sarah Pihonak
*Assistant Examiner* — Jason Deck
(74) *Attorney, Agent, or Firm* — Armstrong Teasdale LLP

(57) ABSTRACT

Provided herein is a liquid pesticidal composition which includes an emulsifier component present in an amount from 3 to 35 parts by weight per 100 parts by weight of the liquid pesticidal composition, a pesticide present in an amount from 1 to 90 parts by weight per 100 parts by weight of the composition, and an optional solvent present in an amount from 0 to 90 parts by weight per 100 parts by weight of the composition. The emulsifier component includes an alkaline earth salt of, or amine salt of, a $C_6$-$C_{22}$ fatty acid along with an alkyl polyglycoside present in an amount from 1 to 20 parts by weight per 100 parts by weight of the composition. The emulsifier component may also include an optional co-emulsifier present in an amount from 0 to 20 parts by weight per 100 parts by weight of the composition.

19 Claims, No Drawings

LIQUID PESTICIDAL COMPOSITION

CROSS-REFERENCE TO RELATED APPLICATIONS

This application is the national stage entry of PCT/US2016/057883, filed on Oct. 20, 2016, which claims the benefit of priority to U.S. Provisional Patent Application No. 62/244,427, filed Oct. 21, 2015, which are incorporated by reference in their entirety herein.

FIELD OF THE DISCLOSURE

The subject disclosure generally relates to a liquid pesticidal composition including an emulsifier component and a pesticide. More specifically, the emulsifier component includes a salt of a fatty acid and an alkyl polyglycoside.

BACKGROUND

There is an increasing demand for crop protection products that are easy to handle, have lower worker exposure risks, lower impact on the environment and have high levels of activity. As is well known in the art, biocides, and in particular pesticides such as fungicides, insecticides and herbicides, are auxiliary agents for agriculture in order to protect and to increase the yield of crops. Depending on the various and often very specific needs, a number of biocides exist, which show very different chemical structures and behaviors. It remains difficult to prepare solutions of these biocides exhibiting a satisfactory stability and use profile. Accordingly, there remains an opportunity for improvement.

SUMMARY OF THE DISCLOSURE

The instant disclosure provides a liquid pesticidal composition. The composition includes an emulsifier component present in an amount from 3 to 35 parts by weight per 100 parts by weight of the liquid pesticidal composition. The emulsifier component includes an alkaline earth salt of, or amine salt of, a $C_6$-$C_{22}$ fatty acid. The emulsifier component also includes an alkyl polyglycoside present in an amount from 1 to 20 parts by weight per 100 parts by weight of the liquid pesticidal composition. The emulsifier component may also include an optional co-emulsifier present in an amount from 0 to 20 parts by weight per 100 parts by weight of the liquid pesticidal composition. The liquid pesticidal composition also includes a pesticide present in an amount from 1 to 90 parts by weight per 100 parts by weight of the liquid pesticidal composition. Moreover, the liquid pesticidal composition may also include an optional solvent present in an amount from 0 to 90 parts by weight per 100 parts by weight of the liquid pesticidal composition.

DETAILED DESCRIPTION OF THE DISCLOSURE

The present disclosure provides a liquid pesticidal composition, which may hereinafter be described as the "composition." The liquid pesticidal composition includes an emulsifier component, a pesticide, and an optional solvent, each described in detail below.

Emulsifier Component:

The emulsifier component is typically used to form a stable emulsion of the liquid pesticidal composition when prepared for agricultural applications. The emulsifier component may also be used to form a stable emulsifiable concentrate, as described in greater detail below. The emulsifier component is present in the liquid pesticidal composition in an amount from 3 to 35 parts by weight, and may alternatively be present in an amount from 5 to 35, from 10 to 35, from 10 to 30, 15 to 30, from 20 to 35, or from 25 to 30, parts by weight, per 100 parts by weight of the liquid pesticidal composition. In various non-limiting embodiments, all values and ranges of values between the aforementioned values are hereby expressly contemplated.

Alkaline Earth Salt of, or Amine Salt of, a $C_6$-$C_{22}$ Fatty Acid:

The emulsifier component includes an alkaline earth salt of, or amine salt of, a $C_6$-$C_{22}$ fatty acid and also includes an alkyl polyglycoside and an optional co-emulsifier, each of which are described in greater detail below. The alkaline earth salt may be alternatively described as an alkaline earth metal salt and typically includes magnesium, calcium, strontium, or combinations thereof, as the alkaline earth metal of the salt. The amine may be any primary, secondary, or tertiary amine salt. In various embodiments, the amine is monoethanolamine, dimethylamine, diethanolamine, triethanolamine, or combinations thereof. The fatty acid may have any number of carbon atoms from 6 to 22, e.g. 6, 7, 8, 9, 10, 11, 12, 13, 14, 15, 16, 17, 18, 19, 20, 21, or 22, or may include a mixture of fatty acids having 6 to 22 carbon atoms. In various non-limiting embodiments, all ranges of values described immediately above are hereby expressly contemplated relative to one or more fatty acids. In various embodiments, the fatty acid is chosen from lauric acid, myristic acid, palmitic acid, palmitoleic acid, stearic acid, isostearic acid, oleic acid, linoleic acid, linolenic acid, behenic acid, erucic acid or their technical blends (e.g. those obtainable from natural triglycerides like coco oil, palm oil, palm kernel oil, olive oil, safflower oil, sunflower oil, soybean oil, corn oil, canola oil, rapeseed oil, tallow, lard, poultry fat, and the like) and combinations thereof. In another embodiment, the fatty acid is derived from tall oil ("tall oil fatty acid") having an average of 12 to 18 carbon atoms. In various embodiments, such compounds have the general formula [R—CO—O]$_a$X in which R—CO is a saturated or unsaturated, linear or branched acyl radical having 6 to 22, and more typically 12 to 22, carbon atoms (e.g. wherein a is 6 to 22 or 12 to 22) and X is an alkaline earth metal, ammonium or alkyl ammonium.

In other embodiments, the emulsifier component includes or is a calcium and/or magnesium salt of oleic acid. Typically, the calcium and magnesium salts of oleic acid have the structures as shown below:

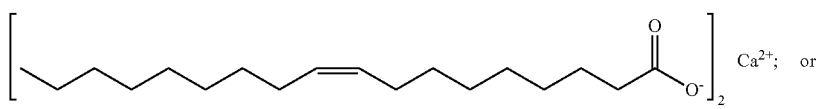

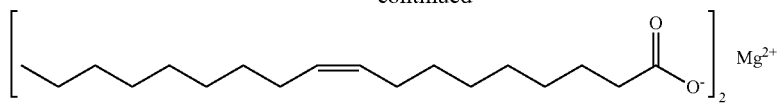

In various embodiments, the alkaline earth salt, or amine salt of, the $C_6$-$C_{22}$ fatty acid is present in the emulsifier component in an amount from 15 to 75, 20 to 70, 35 to 65, 40 to 60, 45 to 55, 45 to 50, or 50 to 55, parts by weight per 100 parts by weight of the emulsifier component. In other embodiments, the alkaline earth salt, or amine salt of, the $C_6$-$C_{22}$ fatty acid is present in the liquid pesticidal composition in an amount from 2 to 8, 3 to 7, 4 to 6, or 5 to 6, parts by weight per 100 parts by weight of the liquid pesticidal composition. In various non-limiting embodiments, all whole and fractional amounts or ranges of amounts within the aforementioned values are hereby expressly contemplated. In various non-limiting embodiments, all whole and fractional amounts or ranges of amounts within the aforementioned values are hereby expressly contemplated.

Alkyl Polyglycoside:

The emulsifier component also includes the alkyl polyglycoside that is present in an amount from 1 to 20 parts by weight per 100 parts by weight of the liquid pesticidal composition. In various embodiments, the alkyl polyglycoside is present in an amount of 1, 2, 3, 4, 5, 6, 7, 8, 9, 10, 11, 12, 13, 14, 15, 16, 17, 18, 19, or 20, parts by weight per 100 parts by weight of the liquid pesticidal composition. In other embodiments, the alkyl polyglycoside is present in an amount from 1.25 to 2, from 1.25 to 1.75, from 1.5 to 2, from 1.5 to 1.75, or from 1.75 to 2, parts by weight per 100 parts by weight of the liquid pesticidal composition. In various non-limiting embodiments, all whole and fractional amounts or ranges of amounts within the aforementioned values are hereby expressly contemplated.

The alkyl polyglycoside is not particularly limited and may be any in the art. For example, the alkyl polyglycoside may be further defined as an alkyl polyglycoside of a $C_8$-$C_{16}$ alcohol or combination of such alcohols. In other embodiments, the alkyl polyglycoside is further defined as an alkyl polyglycoside of a $C_{10}$-$C_{16}$ alcohol or combination of such alcohols. In further embodiments, the alkyl polyglycoside is further defined as an alkyl polyglycoside of a $C_8$-$C_{16}$ alcohol or combination of such alcohols. In various embodiments, the alkyl polyglycoside includes an alkyl polyglycoside of a $C_8$-$C_{10}$ alcohol, an alkyl polyglycoside of a $C_{12}$-$C_{14}$ alcohol, an alkyl polyglycoside of a $C_8$-$C_{16}$ alcohol, an alkyl polyglycoside of a $C_9$-$C_{11}$ alcohol, or combinations thereof.

In still other embodiments, the alkyl polyglycoside has the formula $R'OG_y$, wherein $R'$ is a $C_6$ to $C_{18}$ linear or branched alkyl alcohol group, G is a glycoside, and y is an average degree of polymerization, wherein y is a number greater than 0 and up to 3. In this formula, $R'$ is a $C_6$ to $C_{18}$ linear or branched alkyl alcohol group. However, $R'$ may have any number or range of numbers from 8 to 18 relative to the number of carbon atoms. In various embodiments, $R'$ is a $C_8$ to $C_{16}$, $C_8$ to $C_{14}$, $C_8$ to $C_{12}$, $C_8$ to $C_{10}$, $C_{10}$ to $C_{18}$, $C_{10}$ to $C_{16}$, $C_{10}$ to $C_{14}$, $C_{10}$ to $C_{12}$, $C_{12}$ to $C_{18}$, $C_{12}$ to $C_{16}$, $C_{12}$ to $C_{14}$, $C_{14}$ to $C_{18}$, $C_{14}$ to $C_{18}$, or $C_{16}$ to $C_{18}$, linear or branched alkyl group. Moreover, G is a glycoside. The glycoside may be a molecule wherein a sugar is bound to another functional group via a glycosidic bond. More specifically, the glycoside may be a sugar group that is bonded through its anomeric carbon to another group via a glycosidic bond. Glycosides can be linked by an O- (an O-glycoside), N- (a glycosylamine), S- (a thioglycoside), or C- (a C-glycoside) glycosidic bond. The glycoside may be alternatively described as a "glycosyl compound." In some embodiments, the sugar is bonded to a non-sugar thus excluding polysaccharides. In such embodiments, the sugar group can be described as a glycone and the non-sugar group as an aglycone. The glycone can be a single sugar group (a monosaccharide) or several sugar groups (an oligosaccharide). In one embodiment, the sugar or glycone group is, or is based on, glucose. Furthermore, y is an average degree of polymerization and is a number greater than 0 and up to 3 (i.e., $0<y\leq3$), or any value or range of values therebetween. For example, in various embodiments, y is 1.1 to 2, 1.2 to 1.9, 1.3 to 1.8, from 1.4 to 1.7, from 1.5 to 1.6, from 1.2 to 1.7, etc. All values and ranges of values including and between the aforementioned values are hereby expressly contemplated in various non-limiting embodiments. Non-limiting examples of suitable alkyl polyglycosides are commercially available under the trade names Agnique® PG 264, Agnique® PG 8105, Agnique® PG 8107, Agnique® PG 9116, and Agnique® PG 8166.

In other embodiments, the emulsifier component includes an optional co-emulsifier. The optional co-emulsifier may be an anionic emulsifier and/or a non-ionic emulsifier. The anionic emulsifier may be any known in the art and typically includes alkali, alkaline earth or ammonium salts of fatty acids, such as potassium stearate, alkyl sulfates, alkyl ether sulfates, alkylsulfonates or iso-alkylsulfonates, alkylnaphthalenesulfonates, alkyl methyl ester sulfonates, acyl glutamates, alkylsulfosuccinates, sarcosinates such as sodium lauroyl sarcosinate or taurates, and combinations thereof. In one embodiment, the anionic emulsifier is a calcium dodecylbenzene sulfonate (DDBSA) such as Ninate 401 A, Agnique® ABS 60, and Agnique® ABS 70 C. The anionic emulsifier may be present in the emulsifier component in any amount. In various embodiments, the anionic emulsifier is present in an amount to balance the alkaline earth salt, or amine salt of, the $C_6$-$C_{22}$ fatty acid. In various embodiments, the optional co-emulsifier may be present in an amount from 0 to 20, 5 to 15, 5 to 10, 10 to 15, 15 to 20, parts by weight per 100 parts by weight of the liquid pesticidal composition. Of course, it is to be understood that the instant disclosure is not limited to the aforementioned values and that the non-ionic emulsifier may be present in any whole or fractional amount or range of amounts within the aforementioned values.

The non-ionic emulsifier may be any known in the art and typically includes alkoxylated animal or vegetable fats and oils such as corn oil ethoxylates, soybean oil ethoxylates, castor oil ethoxylates, tallow fatty ethoxylates, glycerol esters such as glycerol monostearate, fatty alcohol alkoxylates and oxoalcohol alkoxylates, fatty acid alkoxylates such as oleic acid ethoxylates, alkylphenol alkoxylates such as isononylphenol ethoxylates, fatty amine alkoxylates, fatty acid amide alkoxylates, sugar surfactants such as sorbitan fatty acid esters (e.g. sorbitan monooleate, and sorbitan tristearate), polyoxyethylene sorbitan fatty acid esters, alkyl polyglycosides, N-alkylgluconamides, alkylmethyl sulfoxides, alkyldimethylphosphine oxides such as tetradecyldimethylphosphine oxide, and combinations thereof. It is also contemplated that the non-ionic emulsifier may be further defined as one or a mixture of surfactants that are commercially available from AkzoNobel under the trade name of Emulpon® and/or from BASF Corporation under the trade name of Cremophor®.

Pesticide:

The liquid pesticidal composition also includes the pesticide. The pesticide is present in an amount from 1 to 90 parts by weight per 100 parts by weight of the liquid pesticidal composition. In various embodiments, the pesticide is present in amounts from 5 to 90, 5 to 85, 5 to 80, 5 to 75, 5 to 70, 5 to 65, 1 to 60, 5 to 60, 10 to 60, 15 to 55, from 20 to 50, from 25 to 45, from 30 to 40, from 35 to 45, or from 35 to 40, parts by weight per 100 parts by weight of the liquid pesticidal composition. In various non-limiting embodiments, the pesticide may be present in any whole or fractional amount or range of amounts within the aforementioned values.

The terminology "pesticide," as used herein, is well known in the art and is described at least by the Environmental Protection Agency (EPA), in the Federal Insecticide, Fungicide, and Rodenticide Act (FIFRA), in the Insecticides and Environmental Pesticide Control Subchapter (7 U.S.C. § 136(u)), in the Code of Federal Regulations (CFR) relating to the "Protection of Environment," and in the Regulations of the EPA in 40 CFR § 152.3. A pesticide is typically recognized in the art as a substance that is used for preventing, destroying, repelling, regulating, and/or mitigating any pest. A pest is an organism that is deleterious to man or the environment but does not include any internal parasite of living man or other living animal or any fungus, bacterium, virus, or other microorganism on or in living man or other living animals. Said differently, the terminology "pest" does not typically include any organism that infects or sickens humans or animals. In addition, the terminology "pesticide," as used herein, does not typically include any human or animal drugs or pharmaceuticals, any article that is a "new animal drug" as defined in the art, any liquid sterilant applied to a device used in the human body, and/or any products intended for use against fungi, bacteria, viruses, or other microorganisms in or on living man or living animal. Moreover, the pesticide of this disclosure does not typically include drugs or pharmaceuticals used to control diseases of humans or animals (such as livestock and pets). In various embodiments, the pesticide is chosen from carbosulfan, triclopyr, bifenthrin, and combinations thereof.

The pesticide may be further defined as an active ingredient such as a fungicide, herbicide, insecticide, and mixtures thereof. Suitable fungicides include, but are not limited to: azoxystrobin, benalaxyl, carbendazim, chlorothalonil, cupfer, cymoxanil, cyproconazol, diphenoconazol, dinocap, epoxyconazol, fluazinam, flusilazol, flutriafol, folpel, fosetyl alumnium, kresoxim methyl, hexaconazol, mancozeb, metalaxyl, metconazol, myclobutanil, ofurace, phentinhydroxide, prochloraz, pyremethanil, soufre, tebucanazol and tetraconazol, and mixtures thereof. Suitable herbicides include, but are not limited to: alachlor, acloniphen, acetochlor, amidosulfuron, aminotriazol, atrazin, bentazon, biphenox, bromoxyl octanoate, bromoxynil, clethodim, chlodinafop-propargyl, chloridazon, chlorsulfuron, chlortoluron, clomazon, cycloxydim, desmedipham, dicamba, dicyclofop-methyl, diurea, difluphenicanil, dimithenamid, ethofumesat, fluazifop, fluazifop-p-butyl, fluorochloridon, fluroxypyr, glufosinat, glyphosate, galoxyfop-R, ioxynil octanoate, isoproturon, isoxaben, metamitron, metazachlor, metolachlor, metsulfuron-methyl, nicosulfuron, notflurazon, oryzalin, oxadiazon, oxyfluorphen, paraquat, pendimethalin, phenmedipham, phenoxyprop-p-ethyl, propaquizafop, prosulfocarb, quizalofop, sulcotrion, sulphosat, terbutylazin, triasulfuron, trichlorpyr, triflualin and triflusulforon-methyl which may be used individually or in admixture with one another. Suitable insecticides include, but are not limited to: biphenthrin, carbofuran, carbosulfan, chlorpyriphos-methyl, chlorpyriphos-ethyl, β-cyfluthrin, λ-cyhalothrin, cyhexatin, cypermethrin, dicofol, endosulfan, τ-fluvalinat, α-methrin, δ-methrin, phenbutatin, pyrimicarb, terbuphos and tebuphenpyrad and mixtures thereof.

Optional Solvent:

The liquid pesticidal composition may also include an optional solvent or solvent component. In various embodiments, the solvent or solvent component may be present in an amount of greater than zero up to an amount of 90 (e.g. 0<amount≤90), greater than zero up to an amount of 80 (e.g. 0<amount≤80), from 5 to 75, from 10 to 70, from 15 to 65, from 20 to 60, from 25 to 55, from 30 to 50, from 35 to 45, or from 40 to 45, parts by weight per 100 parts by weight of the liquid pesticidal composition. Of course, it is to be understood that the instant disclosure is not limited to the aforementioned values and that the solvent component may be present in any whole or fractional amount or range of amounts within the aforementioned values.

The optional solvent may be any known in the art. In one embodiment the solvent is organic. For example, the solvent may be chosen from $C_{10}$-$C_{12}$ alkyl benzenes, N, N-dimethyl lactamide, and combinations thereof. In other embodiments, the solvent is chosen from solvents such as Agnique® AMD810, Aromatic solvents (100, 150), methyl esters, and combinations thereof. In other embodiments, the optional solvent is chosen from Acetic Anhydride; Acetone; α-Alkyl $C_9$-$C_{18}$ ω-hydroxypoly (oxyethylene) 2-20 moles; α-Alkyl C6-C14-ω-hydroxypoly (oxypropylene) block copolymer with polyoxyethylene (POP content is 1-3 moles and POE content is 4-12 moles, weight average molecular weight 635); Amyl acetate; Butanol; Cod Liver Oil; Dipropylene Glycol; Ethyl acetate; Ethyl Alcohol; Ethyl Esters of fatty acids derived from edible fats and oils; 2-Ethyl-1-Hexanol; Glycerol monoacetate (monoacetin); Glycerol di-acetate (diacetin); Glycerol tri-acetate (triacetin); Hexyl Alcohol; Hydrochloric acid; Isopropyl Myristate; Lactic Acid; Lactic acid, 2-ethylhexyl ester; Lactic acid, 2-ethylhexyl ester, (2S)-Lactic acid, n-propyl ester; (S)-Limonene; Methyl Alcohol; Methyl n-Amyl Ketone; Methyl Esters of fatty acids derived from edible fats and oils; Methyl isobutyl ketone; Mineral Oil, USP; Oleyl alcohol; Petroleum Hydrocarbons, light odorless conforming to 21 CFR 172.884 Petroleum Hydrocarbons, synthetic isoparaffinic conforming to 21 CFR 172.882; Propanol; Propylene glycol; Soybean oil derived fatty acids; Xylene meeting specifications set in 21 CFR 172.884 (b) (4); and combinations thereof.

Additives:

The liquid pesticidal composition may also include one or more additives such as a stabilizer of the active component, e.g. epoxidized soybean oil. In other embodiments, the liquid pesticidal composition includes a penetrant, such as Sunspray Oil 6N. In still other embodiments, the liquid pesticidal composition includes spreading agents, wetting agents, building agents, extending agents, emulsifiers, dispersants, suspending agents, plant penetrants, translocators, oils, activators, foliar nutrients, compatibility agents, drift retardants, foam retardants, buffers, inverting agents, soil penetrants, stabilizing agents, UV filters, feeding stimulants, washing agents, sinking agents, binders, liquid carriers, dry carriers such as attapulgite, kaolinite, vermiculite, starch polymers, corn cob, and combinations thereof. The liquid pesticidal composition may also include additional chemical compounds that are not pesticides. Examples include, but are not limited to, activators, anti-feedants, anti-fouling agents, attractant agents, chemosterilants, disinfectant agents, fumigant agents, pheromones, repellent agents, defoliants, desiccants, insect growth regulators, plant growth regulators, synergists, adjuvants, and combinations thereof. In various embodiments, one or more additives may be independently present in the liquid pesticidal composition in an amount from 0 to 30, from 5 to 30, from 10 to 25, or from 15 to 20, parts by weight per 100 parts by weight of the liquid pesticidal composition.

This disclosure also provides a method of forming the liquid pesticidal composition. The method includes the step of combining the emulsifier component, the pesticide, and optionally the solvent. This step may also include adding any additives described above. The aforementioned components and compounds may be added in any order to one or more of each other and in any amount and in one or more individual steps, e.g. in whole or in parts.

Agricultural Emulsion:

The liquid pesticidal composition may be added to water or another solvent to form an agricultural emulsion at point of sale and/or use. Typically, well formed agricultural emulsions are milky in color, spontaneously bloom (i.e., form), and have sufficient stability for efficacious application. However, agricultural emulsions of this disclosure are not limited to such parameters and may have other characteristics that are indicative of successful emulsion formation.

This disclosure also provides an aqueous agricultural liquid pesticidal composition that includes the aforementioned liquid pesticidal composition and water. The liquid pesticidal composition may be combined with the water in a spray tank or in an independent tank prior to addition to a spray tank. For example, the liquid pesticidal composition may be added to an independent container and/or a spray tank with the water or separate from the water. The terminology "aqueous" describes that the agricultural liquid pesticidal composition includes the water. The terminology "agricultural" describes that the agricultural liquid pesticidal composition is typically used to treat plants or crops or used in a farming context. However, the liquid pesticidal composition is not limited to such uses.

The water of the aqueous agricultural liquid pesticidal composition may be present in an amount from 5 to 99.5, from 5 to 95, 10 to 90, 15 to 85, 20 to 80, 25 to 75, 30 to 70, 35 to 65, 40 to 60, 45 to 55, or about 50, parts by weight per 100 parts by weight of the aqueous agricultural liquid pesticidal composition. Similarly, the liquid pesticidal composition may be as described above and may be present in the aqueous agricultural liquid pesticidal composition in any of the aforementioned weight percents, per 100 parts by weight of the aqueous agricultural liquid pesticidal composition.

The pesticide is typically in the aqueous agricultural liquid pesticidal composition in amounts from about 0.00001 to about 10, 0.00001 to about 9, about 0.00001 to about 8, about 0.00001 to about 7, about 0.00001 to about 6, about 0.00001 to about 5, 0.00001 to about 4, about 0.00001 to about 3, about 0.00001 to about 2, about 0.00001 to about 1, about 1 to about 9, about 2 to about 8, about 3 to about 7, about 4 to about 6, or about 5 to about 6, weight percent based on a total weight of the aqueous agricultural liquid pesticidal composition. In further embodiments, the pesticide is present in the aqueous agricultural liquid pesticidal composition in an amount from 3 to 7, or of about 5, parts by weight per 100 parts by weight of the aqueous agricultural liquid pesticidal composition. In still other embodiments, the pesticide is present in an amount (or in an amount equivalent to) from 100 to 1000, from 200 to 900, from 300 to 800, from 400 to 700, from 500 to 600, or about 400, grams of pesticide per hectare. It is contemplated that the aforementioned amounts may alternatively be described as any value, or range of values, both whole and fractional, within or between any one or more values described above. In various embodiments, any one or more of the aforementioned amount(s) may vary by ±1, 2, 3, 4, 5, 6, 7, 8, 9, or 10, %.

Emulsifiable Concentrate:

This disclosure also provides an emulsion that may be formed using an emulsifiable concentrate (also known in the art as an "EC"). The liquid pesticidal composition described above may be further described as an EC or may not be an EC. In various embodiments, the emulsifiable concentrate is typically a liquid that has a viscosity from 1 to 200, 50 to 200, 100 to 200, or less than or equal to about 200, cps at 25° C. Without intending to be bound by any particular theory, it is believed that a viscosity of less than or equal to about 200 cps at 25° C. promotes blooming and efficient formation of an emulsion when the emulsifiable concentrate is used.

The emulsifiable concentrate itself is typically anhydrous, i.e., free of water. Alternatively, the emulsifiable concentrate may include water. In various embodiments, the emulsifiable concentrate may include less than 5, less than 2.5, less than 1, less than 0.5, or less than 0.1, parts by weight of water per 100 parts by weight of the emulsifiable concentrate. In other embodiments, the emulsifiable concentrate may include less than 15, 14, 13, 12, 11, 10, 9, 8, 7, 6, 5, 4, 3, 2, or 1, part by weight of water per 100 parts by weight of the emulsifiable concentrate. Most typically, the emulsifiable concentrate is a single oil-like, e.g. hydrophobic, phase that does not include water. When added to water or another solvent, the emulsifiable concentrate preferably forms a milky white agricultural emulsion that blooms and that has little to no phase separation, as is described in greater detail below.

The emulsifiable concentrate typically includes a single phase. In other words, the emulsifiable concentrate does not typically include a distinct non-polar phase and a distinct polar phase but instead typically includes a single phase that includes the active component, the alkyl polyglycoside, and the emulsifier component. Of course, it is to be appreciated that the single phase may include partial phase separation but does not typically include total phase separation. At low temperatures, phase separation may occur. The emulsifiable concentrate may be described as including or being the aforementioned emulsifier component and the pesticide (e.g. without the optional solvent).

In various embodiments, the liquid pesticidal composition and/or the emulsifiable concentrate exhibits less phase separation than a comparative emulsifiable concentrate that includes calcium dodecylbenzene sulfonate (DDBSA) in place of the calcium and/or magnesium salt of oleic acid, when combined with WHO standard water prepared according to CIPAC MT18.1. In other words, the liquid pesticidal composition, the aqueous agricultural liquid pesticidal composition, and/or the emulsifiable concentrate of this disclosure exhibits less phase separation in hard water than typical comparatives of the art, such as those that use DDBSA. In various embodiments, the liquid pesticidal composition and/or the emulsifiable concentrate exhibits less than 1% of phase separation after 24 hours when combined with 342 ppm WHO standard water prepared according to CIPAC MT18.1. In other embodiments, the liquid pesticidal composition, and/or the emulsifiable concentrate exhibits less than 1% of phase separation after 24 hours when combined with 500 ppm WHO standard water prepared according to CIPAC MT18.1. In still other embodiments, the liquid pesticidal composition, the aqueous agricultural liquid pesticidal composition, and/or the emulsifiable concentrate exhibits less than 1% of phase separation after 24 hours when combined with 1,026 ppm WHO standard water prepared according to CIPAC MT18.1.

Typically, the 1026 ppm $CaCO_3$ equivalent water is prepared by dissolving 0.911 g anhydrous Calcium Chloride+ 0.416 g Magnesium Chloride Hexahydrate per liter of distilled/reverse osmosis water. The 342 ppm $CaCO_3$ equivalent water (i.e., CIPAC MT18.1 Standard Water D) is typically prepared by dissolving 0.304 g anhydrous Calcium Chloride and 0.139 g Magnesium Chloride Hexahydrate per liter of distilled/reverse osmosis water and then adjusting volume and pH with Hydrochloric Acid/Sodium Hydroxide to pH 6.0-7.0. The 500 ppm $CaCO_3$ equivalent water (i.e., CIPAC MT18.1 Standard Water C) is typically prepared by dissolving 0.44 g anhydrous Calcium Chloride and 0.203 g Magnesium Chloride Hexahydrate per liter of distilled/reverse osmosis water and then adjusting volume and pH with Hydrochloric Acid/Sodium Hydroxide to pH 7.0-8.0. The 20 ppm $CaCO_3$ equivalent water (i.e., CIPAC MT18.1 Standard Water B) is typically prepared by transferring 40 ml of CIPAC Standard Water C (500 ppm $CaCO_3$ equivalent water) into a 1000 ml volumetric flask. 0.168 g sodium hydrogen carbonate is then added and volume is adjusted with distilled/reverse osmosis water. pH is then measured and adjusted if necessary with Hydrochloric Acid/Sodium Hydroxide to pH 8.0-9.0.

EXAMPLES

A series of compositions are formed according to this disclosure along with a series of compositions that are not representative of this disclosure because they fail to include an alkaline earth salt of, or amine salt of, a $C_6$-$C_{22}$ fatty acid, or fail to include an alkyl polyglycoside, etc. The compositions are evaluated to determine mL phase separation when combined with various WHO Standard Waters prepared according to CIPAC MT18.1. The results are set forth below.

TABLE 1

|  | Example 1 wt % | Example 2 wt % | Example 3 wt % |
|---|---|---|---|
| Pesticide | 27.2 | 21.7 | 27.4 |
| Additive 1 | 5.2 | 3.6 | 4.7 |
| Additive 2 | 26.2 | 16.5 | 26.4 |
| Solvent 1 | 0 | 0 | 0 |
| Co-Emulsifier | 5.8 | 7.7 | 5.8 |
| Ca Salt of Oleic Acid in Ar 150 | 17.8 | 20.2 | 23.8 |
| Alkyl Polyglycoside | 17.8 | 20.2 | 11.9 |
| Solvent 2 | 0 | 10.1 | 0 |
| Stability 20 | Not tested | Not tested | Not tested |
| Stability 342 | None | Trace | 1 |
| Stability 500 | Not tested | Not tested | Not tested |

|  | Example 4 wt % | Example 5 wt % | Example 6 wt % |
|---|---|---|---|
| Pesticide | 22.1 | 27.4 | 27.4 |
| Additive 1 | 3.8 | 4.7 | 4.7 |
| Additive 2 | 21.9 | 26.3 | 26.4 |
| Solvent 1 | 0 | 5.8 | 0 |
| Co-Emulsifier | 3.3 | 0 | 5.8 |

TABLE 1-continued

| Ca Salt of Oleic Acid in Ar 150 | 24.6 | 9.7 | 23.8 |
|---|---|---|---|
| Alkyl Polyglycoside | 24.3 | 26.1 | 11.9 |
| Solvent 2 | 0 | 0 | 0 |
| Stability 20 | Trace | 1 | 1 |
| Stability 342 | 0.5 | Not tested | Not tested |
| Stability 500 | trace | Not tested | Not tested |

|  | Example 7 wt % | Example 8 wt % |
|---|---|---|
| Pesticide | 30.1 | 30.1 |
| Additive 1 | 4.8 | 5.0 |
| Additive 2 | 28.4 | 28.5 |
| Solvent 1 | 16.3 | 16.2 |
| Co-Emulsifier | 10.5 | 10.5 |
| Mg salt of Oleic acid in AMD 810 | 4.9 | 0 |
| 70:30 Mg:Ca salt of Oleic acid in AMD 810 | 0 | 4.9 |
| Alkyl Polyglycoside | 5 | 4.8 |
| Solvent 2 | 0 | 0 |
| Stability 20 | 1.5 | 1.5 |
| Stability 342 | 1 | 1 |
| Stability 500 | 0.5 | 0.5 |

|  | Example 9 wt % | Example 10 wt % | Example 11 wt % |
|---|---|---|---|
| Pesticide | 30.1 | 30.1 | 27.6 |
| Additive 1 | 4.9 | 4.9 | 4.6 |
| Additive 2 | 28.4 | 28.4 | 26.5 |
| Solvent 1 | 16.3 | 0 | 0.0 |
| Co-Emulsifier | 10.5 | 10.5 | 5.9 |
| Mg salt of Oleic acid in AMD 3 L | 4.9 | 4.9 | 8.8 |
| Alkyl Polyglycoside | 4.9 | 4.9 | 8.9 |
| Solvent 2 | 0 | 16.3 | 0 |
| Solvent 3 | 0 | 0 | 17.6 |
| Stability 20 | 1 | None | None |
| Stability 342 | 1.5 | None | None |
| Stability 500 | 1 | None | None |

|  | Example 12 wt % | Example 13 wt % | Example 14 wt % |
|---|---|---|---|
| Pesticide | 28.7 | 31.0 | 31.0 |
| Additive 1 | 4.3 | 4.4 | 4.4 |
| Additive 2 | 25.2 | 25.2 | 25.2 |
| Solvent 1 | 0 | 0 | 0 |
| Co-Emulsifier | 5.7 | 5.6 | 5.7 |
| Mg salt of Oleic acid in AMD 3 L | 7.1 | 4.8 | 0 |
| Mg Salt of Oleic Acid 50:50 AMD 3 L:Me Soyate | 0 | 0 | 4.8 |
| Alkyl Polyglycoside | 7.0 | 4.8 | 4.8 |
| Solvent 2 | 0 | 0 | 0 |
| Solvent 3 | 22.0 | 24.2 | 24.1 |
| Stability 20 | None | None | trace |
| Stability 342 | None | None | None |
| Stability 500 | None | None | None |

Relative to Examples 1-14, the components used are as follows:

Pesticide is carbosulfan commercially available from FMC Corporation.

Additive 1 is epoxidized soybean oil commercially available from Arkema under the trade name of Vikoflex® 7170

Additive 2 is Sunspray Oil 6N commercially available from R.E. Carroll, Inc.

Solvent 1 is Aromatic 100 commercially available from ExxonMobil.

Solvent 2 is Agnique® AMD 3 L commercially available from BASF Corporation.

Solvent 3 is Agnique® ME 1218 commercially available from BASF Corporation.

Co-Emulsifier is a combination of Agnique® SMO-20 (16.90 g); Agnique® BP 4-3103 (15.47 g); and Agnique® STO-2095 (29.98 g), each commercially available from BASF Corporation.

Alkyl Polyglycoside is Agnique® PG 264 commercially available from BASF Corporation.

Stability 20 is measured visually after 24 hours in 20 ppm WHO Standard Water prepared according to CIPAC MT18.1 and is reported in mL phase separation.

Stability 342 is measured visually after 24 hours in 342 ppm WHO Standard Water prepared according to CIPAC MT18.1 and is reported in mL phase separation.

Stability 500 is measured visually after 24 hours in 500 ppm WHO Standard Water prepared according to CIPAC MT18.1 and is reported in mL phase separation.

TABLE 2

|  | Example 15 wt % | Example 16 wt % | Example 17 wt % |
|---|---|---|---|
| Pesticide | 59.4 | 59.3 | 58.4 |
| Solvent 1 | 23.72 | 0 | 23.4 |
| Solvent 2 | 0 | 22.3 | 0 |
| Co-Emulsifier 1 | 2.03 | 2.0 | 2.1 |
| Co-Emulsifier 2 | 6.94 | 8.6 | 8.3 |
| Ca Salt of Oleic Acid in Ar 150 | 2.99 | 0 | 2.9 |
| Mg Salt of Oleic Acid in AMD 3 L | 0 | 3.0 | 0 |
| Alkyl Polyglycoside | 4.92 | 4.8 | 4.9 |
| Stability 34 | Not tested | Not tested | Not tested |
| Stability 342 | 0.09 | 0.3 | 0.08 |
| Stability 1000 | Not tested | Not tested | Not tested |

Relative to Examples 15-17, the components used are as follows:

Pesticide is triclopyr commercially available from DOW AgroSciences.

Solvent 1 is Agnique® ME 1218 commercially available from BASF Corporation.

Solvent 2 is Agnique® ME 610 commercially available from BASF Corporation.

Co-Emulsifier 1 is Tergitol XD which is commercially available from Dow Chemical.

Co-Emulsifier 2 is Lutensol TDA-9 which is commercially available from BASF Corporation.

Alkyl Polyglycoside is AgniqueR PG 264 commercially available from BASF Corporation.

Stability 20 is measured visually after 24 hours in 34 ppm WHO Standard Water prepared according to CIPAC MT18.1 and is reported in mL phase separation.

Stability 342 is measured visually after 24 hours in 342 ppm WHO Standard Water prepared according to CIPAC MT18.1 and is reported in mL phase separation.

Stability 500 is measured visually after 24 hours in 1000 ppm WHO Standard Water prepared according to CIPAC MT18.1 and is reported in mL phase separation.

TABLE 3

|  | Example 18 wt % | Example 19 wt % | Example 20 wt % |
|---|---|---|---|
| Pesticide | 59.4 | 59.3 | 59.4 |
| Solvent 1 | 23.8 | 0 | 23.8 |
| Solvent 2 | 0 | 22.2 | 0 |
| Co-Emulsifier 1 | 2.0 | 2.0 | 1.9 |
| Co-Emulsifier 2 | 6.9 | 8.6 | 6.9 |
| Ca Salt of Oleic Acid in Ar 150 | 0 | 0 | 3.1 |
| Ca Salt of Oleic Acid in Oleic Acid | 0 | 3.0 | 0 |
| Ca Salt of Oleic Acid in AMD 3 L | 3.0 | 0 | 0 |
| Mg Salt of Oleic Acid in AMD 3 L | 0 | 0.0 | 0 |
| Alkyl Polyglycoside | 4.9 | 4.9 | 4.9 |
| Stability 34 | 0.15 | Not tested | 0.2 |
| Stability 342 | 0.14 | 0.05 | 0.2 |
| Stability 1000 | 0.15 | Not tested | 0.2 |

|  | Example 21 wt % | Example 22 wt % | Example 23 wt % |
|---|---|---|---|
| Pesticide | 59.4 | 59.3 | 59.3 |
| Solvent 1 | 23.8 | 23.8 | 23.8 |
| Solvent 2 | 0 | 0 | 0 |
| Co-Emulsifier 1 | 2.0 | 2.1 | 2.0 |
| Co-Emulsifier 2 | 6.9 | 6.9 | 7.0 |
| Ca Salt of Oleic Acid in Ar 150 | 3.0 | 0 | 0.0 |
| Ca Salt of Oleic Acid in Oleic Acid | 0 | 0 | 0 |
| Ca Salt of Oleic Acid in AMD 3 L | 0 | 0 | 0 |
| Mg Salt of Oleic Acid in AMD 3 L | 0 | 3.0 | 3.0 |
| Alkyl Polyglycoside | 4.9 | 4.9 | 4.9 |
| Stability 34 | 0.15 | 0.17 | 0.17 |
| Stability 342 | 0.05 | 0.10 | 0.13 |
| Stability 1000 | 0.05 | 0.17 | 0.1 |

Relative to Examples 18-23, the components used are as follows:

Pesticide is triclopyr commercially available from DOW AgroSciences.

Solvent 1 is Agnique® ME 1218 commercially available from BASF Corporation.

Solvent 2 is Agnique® ME 610 commercially available from BASF Corporation.

Co-Emulsifier 1 is Tergitol XD which is commercially available from Dow Chemical.

Co-Emulsifier 2 in Examples 17-19 is Lutensol TDA-9 which is commercially available from BASF Corporation.

Co-emulsifier 2 in Examples 20 and 21 is Agnique® PE TDA-6 which is commercially available from BASF Corporation.

Co-emulsifier 2 in Example 22 is Lutensol A03 which is commercially available from BASF Corporation.

Alkyl Polyglycoside is Agnique® PG 264 commercially available from BASF Corporation.

Stability 20 is measured visually after 24 hours in 20 ppm WHO Standard Water prepared according to CIPAC MT18.1 and is reported in mL phase separation.

Stability 342 is measured visually after 24 hours in 342 ppm WHO Standard Water prepared according to CIPAC MT18.1 and is reported in mL phase separation.

Stability 500 is measured visually after 24 hours in 500 ppm WHO Standard Water prepared according to CIPAC MT18.1 and is reported in mL phase separation.

TABLE 4

|  | Example 24 wt % | Example 25 wt % |
|---|---|---|
| Pesticide | 59.4 | 59.3 |
| Solvent | 23.8 | 22.2 |
| Co-Emulsifier 1 | 2.0 | 2.0 |
| Co-Emulsifier 2 | 6.9 | 8.6 |

TABLE 4-continued

|  | Example 24 wt % | Example 25 wt % |
|---|---|---|
| Ca Salt of Oleic Acid in Ar 150 | 3.0 | 3.0 |
| Alkyl Polyglycoside | 4.9 | 4.9 |
| Stability 342 | 0.09 | 0.04 |

In Table 4, the components used are as follows:

The Pesticide is Triclopyr which is commercially available from DowAgroSciences.

Co-Emulsifier 1 is Tergitol XD which is commercially available from DOW Chemical.

Co-Emulsifier 2 is Lutensol TDA-9 which is commercially available from BASF Corporation.

Solvent is Agnique® ME 1218 which is commercially available from BASF Corporation.

The Alkyl Polyglycoside is Agnique® PG 264 commercially available from BASF Corporation.

Stability 342 is measured visually after 24 hours in 342 ppm WHO Standard Water prepared according to CIPAC MT18.1 and is reported in mL phase separation.

TABLE 5

|  | Example 26 wt % | Example 27 wt % |
|---|---|---|
| Pesticide | 59.3 | 60.1 |
| Solvent | 23.7 | 23.1 |
| Co-Emulsifier 1 | 0 | 0 |
| Co-Emulsifier 2 | 2.0 | 2.1 |
| Co-Emulsifier 3 | 7.0 | 6.9 |
| Mg Salt of Oleic Acid in 50:50 AMD 3 L:AMD 810 | 0 | 3.1 |
| Mg Salt of Oleic Acid in 50:50 AMD 3 L:Me Soyate | 3.1 | 0 |
| Alkyl Polyglycoside | 4.9 | 4.7 |
| Stability 34 | Not tested | Not tested |
| Stability 342 | 0.08 | 0.22 |
| Stability 1000 | Not tested | Not tested |

In Table 5, the components used are as follows:

The Pesticide is Triclopyr which is commercially available from DowAgroSciences.

Co-Emulsifier 1 is BP NP 1530 which is commercially available from BASF Corporation.

Co-Emulsifier 2 is Tergitol XD which is commercially available from DOW AgroSciences.

Co-emulsifier 3 is Lutensol A03 which is commercially available from BASF Corporation.

Solvent is Agnique® ME 1218 which is commercially available from BASF Corporation.

The Alkyl Polyglycoside is Agnique® PG 264 commercially available from BASF Corporation.

Stability 342 is measured visually after 24 hours in 342 ppm WHO Standard Water prepared according to CIPAC MT18.1 and is reported in mL phase separation.

TABLE 6

|  | Example 28 wt % | Example 29 wt % |
|---|---|---|
| Pesticide | 59.3 | 59.2 |
| Solvent | 23.7 | 23.5 |
| Co-Emulsifier 1 | 2.0 | 2.1 |
| Co-Emulsifier 2 | 0 | 0 |
| Co-Emulsifier 3 | 6.9 | 7.0 |
| Mg Salt of Oleic Acid in 50:50 AMD 3 L:AMD 810 | 0 | 0 |
| Mg Salt of Oleic Acid in 50:50 AMD 3 L:Me Soyate | 3.1 | 0 |
| Mg Salt of Oleic Acid in 50:50 AMD 3 L:Lorol 8-98 | 0 | 3.2 |
| Alkyl Polyglycoside | 5.0 | 5.0 |
| Stability 34 | 0.01 | 0.03 |
| Stability 342 | Not tested | Not tested |
| Stability 1000 | Not tested | Not tested |

In Table 6, the components used are as follows:

The Pesticide is Triclopyr which is commercially available from DowAgroSciences.

Co-Emulsifier 1 is BP NP 1530 which is commercially available from BASF Corporation.

Co-Emulsifier 2 is Tergitol XD which is commercially available from DOW AgroSciences.

Co-emulsifier 3 is Lutensol A03 which is commercially available from BASF Corporation.

Solvent is Agnique® ME 1218 which is commercially available from BASF Corporation.

The Alkyl Polyglycoside is Agnique® PG 264 commercially available from BASF Corporation.

Stability 342 is measured visually after 24 hours in 342 ppm WHO Standard Water prepared according to CIPAC MT18.1 and is reported in mL phase separation.

Comparative Example 1

To form Comparative Example 1, the following are utilized:

TABLE 7

| Comparative Example | 1 wt % |
|---|---|
| Pesticide | 30 |
| Additive 1 | 5 |
| Additive 2 | 28.87 |
| Solvent | 28.63 |
| Co-Emulsifier | 8.5 |
| Stability 20 | 0.5 |
| Stability 342 | 1 |
| Stability 500 | Trace |

In Table 7, the components used are as follows:

Pesticide is carbosulfan commercially available from FMC Corporation.

Additive 1 is epoxidized soybean oil commercially available from Arkema under the trade name of Vikoflex® 7170.

Additive 2 is Sunspray Oil 6N commercially available from R.E. Carroll, Inc.

Solvent is Aromatic 100 commercially available from ExxonMobil.

The Co-Emulsifier is a combination of 37.59% Naxate 260 (CaDDBS); 16.94% Agnique® SMO-20 (sorbitan monooleate POE 20); 15.47% Agnique® BP 4-3103 (butyl block copolymer ST-8056); and 30.00% Agnique® STO-20 (sorbitan trioleate POE20).

Stability 20 is measured visually after 24 hours in 20 ppm WHO Standard Water prepared according to CIPAC MT18.1 and is reported in mL.

Stability 342 is measured visually after 24 hours in 342 ppm WHO Standard Water prepared according to CIPAC MT18.1 and is reported in mL.

Stability 500 is measured visually after 24 hours in 500 ppm WHO Standard Water prepared according to CIPAC MT18.1 and is reported in mL.

TABLE 8

| Comparative Example | 2 wt % |
|---|---|
| Pesticide | 61.60 |
| Co-Emulsifier 1 | 3.09 |
| Co-Emulsifier 2 | 2.06 |
| Solvent | 33.26 |
| Stability 34 | None |
| Stability 342 | None |
| Stability 1000 | None |

In Table 8, the components used are as follows:

The Pesticide is Triclopyr which is commercially available from DowAgroSciences.

The Co-Emulsifier 1 is Naxate 260 L which is commercially available from Nease Corporation.

The Co-Emulsifier 2 is Tergitol XD which is commercially available from Dow Chemical.

The Solvent is Agnique® ME-1218 which is commercially available from BASF Corporation.

The stability evaluations show that there is no cream in 34, 342 and 1000 ppm water.

Stability 34 is measured visually after 24 hours in 34 ppm WHO Standard Water prepared according to CIPAC MT18.1 and is reported in mL.

Stability 342 is measured visually after 24 hours in 342 ppm WHO Standard Water prepared according to CIPAC MT18.1 and is reported in mL.

Stability 1000 is measured visually after 24 hours in 1000 ppm WHO Standard Water prepared according to CIPAC MT18.1 and is reported in mL.

The data set forth above in Examples 1-14 show that formulations of emulsifiable concentrates of carbosulfan with an emulsifier including a salt of oleic acid and other co-emulsifiers are as stable as or exhibit improved stability over a standard carbosulfan EC formulated with a CaDDBS emulsifier and co-emulsifiers (Comparative Example 1) in WHO standard waters of 20, 342 and 500 ppm water hardness. Furthermore, Examples 2, 10, 11, 12 and 13 provide additional formulation improvement by setting forth an EC that is free of an aromatic solvent. Example 2 and 10 use Agnique® AMD 3 L in place of Aromatic 100 and Examples 2 and 10 provide better stability in WHO standard waters than Comparative Example 1 formulated with Aromatic 100. Examples 11, 12 and 13 replace the Aromatic 100 solvent with a methyl ester solvent (Agnique® ME 1218) which also gives better stability in WHO standard waters than Comparative Example 1. These examples collectively demonstrate that carbosulfan can be formulated into an emulsifiable concentrate (EC) using salts of oleic acid in place of CaDDBS, and further demonstrate the improvement of substituting a non-aromatic solvent for Aromatic 100 to provide EC formulations free of aromatic solvents.

The data set forth above in Examples 15-25 show that the formulation of emulsifiable concentrates of triclopyr with an emulsifier including a salt of oleic acid and other co-emulsifiers demonstrate similar stability to a standard triclopyr EC formulated with a CaDDBS emulsifier and co-emulsifiers (Comparative Examples 2) in WHO standard waters of 34, 342, and 1000 ppm water hardness and are commercially acceptable formulations. Examples 18, 20, 22, 23, and 24 provide EC stability equivalent to the Comparative Example 2 without the use of a CaDDBS emulsifier. Furthermore, additional formulation improvement has been demonstrated in Examples 14-24 by the use of methyl ester solvents in place of Aromatic 100 solvent utilized in Comparative Example 2. These examples collectively demonstrate that triclopyr can be formulated into an emulsifiable concentrate (EC) using salts of oleic acid in place of CaDDBS, and further demonstrate the improvement of substituting a non-aromatic solvent for Aromatic 100 for commercially acceptable formulations.

All combinations of the aforementioned embodiments throughout the entire disclosure are hereby expressly contemplated in one or more non-limiting embodiments even if such a disclosure is not described verbatim in a single paragraph or section above. In other words, an expressly contemplated embodiment may include any one or more elements described above selected and combined from any portion of the disclosure.

One or more of the values described above may vary by ±5%, ±10%, ±15%, ±20%, ±25%, etc. so long as the variance remains within the scope of the disclosure. Unexpected results may be obtained from each member of a Markush group independent from all other members. Each member may be relied upon individually and or in combination and provides adequate support for specific embodiments within the scope of the appended claims. The subject matter of all combinations of independent and dependent claims, both singly and multiply dependent, is herein expressly contemplated. The disclosure is illustrative including words of description rather than of limitation. Many modifications and variations of the present disclosure are possible in light of the above teachings, and the disclosure may be practiced otherwise than as specifically described herein.

It is also to be understood that any ranges and subranges relied upon in describing various embodiments of the present disclosure independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present disclosure, and such ranges and subranges may be further delineated into relevant halves, thirds, quarters, fifths, and so on. As just one example, a range "of from 0.1 to 0.9" may be further delineated into a lower third, i.e. from 0.1 to 0.3, a middle third, i.e. from 0.4 to 0.6, and an upper third, i.e. from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

What is claimed is:

1. A liquid pesticidal composition comprising:
   A. an emulsifier component present in an amount from 3 to 35 parts by weight per 100 parts by weight of said liquid pesticidal composition and comprising:
      (1) an alkaline earth salt of, or amine salt of, a $C_6$-$C_{22}$ fatty acid; and
      (2) an alkyl polyglycoside present in an amount from 1 to 20 parts by weight per 100 parts by weight of said liquid pesticidal composition;
   B. a pesticide present in an amount from 20 to 90 parts by weight per 100 parts by weight of said liquid pesticidal composition; and
   C. an optional solvent present in an amount from greater than 0 to less than or equal to 90 parts by weight per 100 parts by weight of said liquid pesticidal composition, wherein if said solvent is present, said solvent is one of: N,N-dimethyl lactamide; a methyl ester; $C_8$-$C_{10}$ N,N-dimethyl amide; and combinations thereof.

2. The liquid pesticidal composition of claim 1 wherein said fatty acid is oleic acid.

3. The liquid pesticidal composition of claim 1 wherein said emulsifier component comprises said alkaline earth salt of said fatty acid and said alkaline earth salt comprises a calcium salt of oleic acid and a magnesium salt of oleic acid.

4. The liquid pesticidal composition of claim 1 wherein said emulsifier component comprises said alkaline earth salt of said fatty acid and said alkaline earth salt is a calcium salt of oleic acid.

5. The liquid pesticidal composition of claim 1 wherein said emulsifier component comprises said alkaline earth salt of said fatty acid and said alkaline earth salt is a magnesium salt of oleic acid.

6. The liquid pesticidal composition of claim 1 wherein said emulsifier component comprises said amine salt of said fatty acid and said amine salt is an amine salt of oleic acid.

7. The liquid pesticidal composition of claim 1 wherein said alkaline earth salt of, or amine salt of, said $C_6$-$C_{22}$ fatty acid is present in said emulsifier component in an amount from 0.25 to 25 parts by weight per 100 parts by weight of said emulsifier component.

8. The liquid pesticidal composition of claim 1 wherein said alkaline earth salt of, or amine salt of, said $C_6$-$C_{22}$ fatty acid is present in said liquid pesticidal composition in an amount from 2 to 8 parts by weight per 100 parts by weight of said liquid pesticidal composition.

9. The liquid pesticidal composition of claim 1 wherein said alkaline earth salt of, or amine salt of, said $C_6$-$C_{22}$ fatty acid is present in said emulsifier component in an amount from 15 to 75 parts by weight per 100 parts by weight of said emulsifier component.

10. The liquid pesticidal composition of claim 1 wherein said pesticide is selected from the group consisting of: carbosulfan, triclopyr, bifenthrin, and combinations thereof.

11. The liquid pesticidal composition of claim 1 wherein said pesticide is present in an amount from 20 to 60 parts by weight per 100 parts by weight of said liquid pesticidal composition.

12. The liquid pesticidal composition of claim 1 wherein said solvent is present in an amount from greater than 0 to less than or equal to 90 parts by weight per 100 parts by weight of said liquid pesticidal composition, wherein said solvent is N, N-dimethyl lactamide.

13. The liquid pesticidal composition of claim 1 further comprising a co-emulsifier present in an amount from 0 to 20 parts by weight per 100 parts by weight of said liquid pesticidal composition, wherein said co-emulsifier comprises an anionic emulsifier.

14. The liquid pesticidal composition of claim 13 wherein said anionic emulsifier is calcium dodecylbenzene sulfonate.

15. The liquid pesticidal composition of claim 1 further comprising a co-emulsifier present in an amount from 0 to 20 parts by weight per 100 parts by weight of said liquid pesticidal composition, wherein said co-emulsifier comprises a non-ionic emulsifier.

16. The liquid pesticidal composition of claim 1 wherein said alkyl polyglycoside is further defined as an alkyl polyglycoside of a $C_6$-$C_{18}$ alcohol.

17. The liquid pesticidal composition of claim 1 wherein said alkyl polyglycoside comprises an alkyl polyglycoside of a $C_8$-$C_{10}$ alcohol, an alkyl polyglycoside of a $C_{12}$-$C_{14}$ alcohol, an alkyl polyglycoside of a $C_8$-$C_{16}$ alcohol, or an alkyl polyglycoside of a $C_9$-$C_{11}$ alcohol, or combinations thereof.

18. An agricultural emulsion comprising water and said liquid pesticidal composition of claim 1.

19. The liquid pesticidal composition of claim 1 wherein said pesticide is present in an amount from 35 to 70 parts by weight per 100 parts by weight of said liquid pesticidal composition.

* * * * *